United States Patent
Li et al.

(10) Patent No.: US 8,536,871 B2
(45) Date of Patent: Sep. 17, 2013

(54) METHOD OF CORRECTING RESISTIVITY MEASUREMENTS FOR TOLL BENDING EFFECTS

(75) Inventors: Jing Li, Sugar Land, TX (US); Tsili Wang, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 416 days.

(21) Appl. No.: 12/917,952

(22) Filed: Nov. 2, 2010

(65) Prior Publication Data
US 2012/0105076 A1    May 3, 2012

(51) Int. Cl.
*G01V 3/00* (2006.01)
*G01V 3/18* (2006.01)

(52) U.S. Cl.
USPC .......................................... 324/338; 324/340

(58) Field of Classification Search
None
See application file for complete search history.

(56) References Cited

U.S. PATENT DOCUMENTS

| | | | |
|---|---|---|---|
| 5,045,795 A | 9/1991 | Gianzero et al. |
| 6,181,138 B1 | 1/2001 | Hagiwara et al. |
| 6,297,639 B1 | 10/2001 | Clark et al. |
| 6,476,609 B1 | 11/2002 | Bittar |
| 6,509,738 B1 | 1/2003 | Minerbo et al. |
| 6,556,015 B1 | 4/2003 | Omeragic et al. |
| 6,566,881 B2 | 5/2003 | Omeragic et al. |
| 6,573,722 B2 | 6/2003 | Rosthal et al. |
| 6,819,110 B2 | 11/2004 | Omeragic et al. |
| 6,836,218 B2 | 12/2004 | Frey et al. |
| 6,903,553 B2 | 6/2005 | Itskovich et al. |
| 6,911,824 B2 | 6/2005 | Bittar |
| 6,937,022 B2 | 8/2005 | Itskovich et al. |
| 6,969,994 B2 | 11/2005 | Minerbo et al. |
| 6,998,844 B2 | 2/2006 | Omeragic et al. |
| 7,003,401 B2 | 2/2006 | Haugland |
| 7,019,528 B2 | 3/2006 | Bittar |
| 7,038,457 B2 | 5/2006 | Chen et al. |
| 7,057,392 B2 | 6/2006 | Wang et al. |
| 7,138,803 B2 | 11/2006 | Bittar |
| 7,202,670 B2 | 4/2007 | Omeragic et al. |
| 7,243,719 B2 | 7/2007 | Baron et al. |
| 7,265,552 B2 | 9/2007 | Bittar |
| 7,269,515 B2 | 9/2007 | Tabarovsky et al. |
| 7,274,991 B2 | 9/2007 | Tabarovsky et al. |

(Continued)

FOREIGN PATENT DOCUMENTS

| | | |
|---|---|---|
| EP | 2447738 A1 | 5/2012 |
| MX | 2011011598 A | 5/2012 |
| WO | 0050926 A1 | 8/2000 |

OTHER PUBLICATIONS

Fang, S., et al.; "Determination of structural dip and azimuth from LWD azimuthal propagation resistivity measurements in anisotropic formations". 2008 SPE Annual Technical Conference and Exhibition, Denver, CO, Sep. 21-24, 2008.

(Continued)

*Primary Examiner* — Minh N Tang
(74) *Attorney, Agent, or Firm* — Kenneth Liu; Jeremy Berman

(57) ABSTRACT

A method for correcting subterranean resistivity measurements to account for tool bending includes processing at least one coupling component and at least one cross-coupling component in combination with a tool bending angle. Such processing may, for example, remove one or more coupling components from a cross-coupling component. Removal of the coupling component(s) tends to increase the sensitivity of directional resistivity measurements to remote boundaries.

17 Claims, 7 Drawing Sheets

(56) References Cited

U.S. PATENT DOCUMENTS

| | | |
|---|---|---|
| 7,286,091 B2 | 10/2007 | Chen et al. |
| 7,345,487 B2 | 3/2008 | Bittar et al. |
| 7,353,613 B2 | 4/2008 | Bartel et al. |
| 7,382,135 B2 | 6/2008 | Li et al. |
| 7,385,400 B2 | 6/2008 | Moore |
| 7,414,405 B2 | 8/2008 | Moore |
| 7,414,407 B2 | 8/2008 | Wang et al. |
| 7,436,184 B2 | 10/2008 | Moore |
| 7,463,035 B2 | 12/2008 | Merchant et al. |
| 7,471,088 B2 | 12/2008 | Yu et al. |
| 8,085,050 B2 * | 12/2011 | Bittar et al. .................. 324/339 |
| 8,207,738 B2 | 6/2012 | Wang |
| 2004/0113626 A1 | 6/2004 | Wang et al. |
| 2007/0024286 A1 | 2/2007 | Wang |
| 2008/0068022 A1 | 3/2008 | Peter et al. |
| 2008/0074336 A1 | 3/2008 | Signorelli et al. |
| 2008/0078580 A1 | 4/2008 | Bittar |
| 2008/0158082 A1 | 7/2008 | Wang et al. |
| 2008/0246486 A1 | 10/2008 | Forgang et al. |
| 2008/0290873 A1 | 11/2008 | Homan et al. |
| 2009/0015261 A1 | 1/2009 | Yang et al. |
| 2009/0230968 A1 * | 9/2009 | Bittar et al. .................. 324/338 |
| 2010/0244841 A1 | 9/2010 | Wang |
| 2010/0283470 A1 | 11/2010 | Streinz et al. |

OTHER PUBLICATIONS

Li, Q., et al.; "New directional electromagnetic tool for proactive geosteering and accurate formation evaluation while drilling". SPWLA 46th Annual Logging Symposium, Jun. 26-29, 2005, pp. 1-16.

Extended European Search Report of European Patent Application No. 11187403.8 dated Feb. 13, 2012.

\* cited by examiner

METHOD OF CORRECTING RESISTIVITY MEASUREMENTS FOR TOLL BENDING EFFECTS

RELATED APPLICATIONS

None.

FIELD OF THE INVENTION

The present invention relates generally to methods for making downhole directional resistivity measurements of a subterranean formation. More particularly, the invention relates to a method for correcting such directional resistivity measurements to account for tool bending.

BACKGROUND OF THE INVENTION

Directional resistivity measurements are commonly utilized to provide information about remote geological features not intercepted by the measurement tool (e.g., remote beds, bed boundaries, and/or fluid contacts). Such information includes, for example, the distance from and direction to the remote feature. In geosteering applications, directional resistivity measurements may be utilized in making steering decisions for subsequent drilling of the borehole. For example, an essentially horizontal section of a borehole may be routed through a thin oil bearing layer. Due to the dips and faults that may occur in the various layers that make up the strata, the distance between a bed boundary and the drill bit may be subject to change during drilling. Real-time distance and direction measurements may enable the operator to adjust the drilling course so as to maintain the bit at some predetermined distance from the boundary layer. Directional resistivity measurements also enable valuable geological information to be estimated, for example, including the dip and strike angles of the boundary as well as the vertical and horizontal conductivities of the formation.

Methods are known in the art for making LWD directional resistivity measurements. These measurements commonly involve transmitting and/or receiving transverse (x-mode) or mixed mode (e.g., mixed x- and z-mode) electromagnetic waves. Various tool configurations are known in the art for making such measurements. For example, U.S. Pat. No. 6,181,138 to Hagiwara teaches a method that employs an axial (z-mode) transmitting antenna and three co-located, circumferentially offset tilted receiving antennae. U.S. Pat. No. 6,969,994 to Minerbo et al., U.S. Pat. No. 7,202,670 to Omeragic et al., and U.S. Pat. No. 7,382,135 to Li et al teach a method that employs an axial transmitting antenna and two axially spaced tilted receiving antennae. The receiving antennae are further circumferentially offset from one another by an angle of 180 degrees. U.S. Pat. Nos. 6,476,609, 6,911,824, 7,019,528, 7,138,803, and 7,265,552 to Bittar teach a method that employs an axial transmitting antenna and two axially spaced tilted receiving antennae in which the tilted antennae are tilted in the same direction. U.S. Pat. Nos. 7,057,392 and 7,414,407 to Wang et al teach a method that employs an axial transmitting antenna and two longitudinally spaced transverse receiving antennae.

In order to detect a remote boundary (e.g., a bed boundary or a fluid contact), the transmitted electromagnetic signal must typically reflect off the boundary and then propagate back to the measurement tool (where it is received). As known to those of ordinary skill in the art, the intensity of this reflected signal tends to decrease with increasing distance to the remote boundary. In order to detect distant bed boundaries (e.g., on the order of 10-20 feet from the wellbore), direct couplings between transmitter and receiver antennae are preferably eliminated. This can be accomplished, for example, via the use of a transmitter and a receiver having orthogonal moments.

One difficulty, however, is that bending of the directional resistivity tool in the borehole introduces direct couplings by changing the angle between the transmitter and receiver moments (such they are no longer perfectly orthogonal). For a distant bed boundary (e.g., on the order of 20 feet from the wellbore), even moderate tool bending (e.g., about 5 degrees per 100 feet) can significantly distort the reflected signal. Such distortion renders it difficult, or at times even impossible, to determine a reliable distance and/or direction to the boundary layer. Therefore, there is a need in the art to address the effect of tool bending on directional resistivity measurements. In particular, there is a need for a method for removing the direct couplings caused by tool bending from directional resistivity measurements.

SUMMARY OF THE INVENTION

Aspects of the present invention are intended to address the above described need for a method for making improved directional resistivity measurement and in particular a method for correcting directional resistivity measurements to account for tool bending effects. In one aspect the present invention includes a method for correcting directional resistivity measurements in which at least one coupling component and at least one cross-coupling component are processed in combination with a tool bending angle to correct directional resistivity measurements. In preferred embodiments of the invention, the received coupling components are removed from at least one measured cross-coupling component.

Exemplary embodiments of the present invention advantageously provide several technical advantages. For example, methods in accordance with the invention tend to advantageously improve the accuracy of directional resistivity measurements. Moreover, by removing the coupling components, the invention tends to increase the sensitivity of directional resistivity measurements to remote boundaries, particularly distant boundaries (e.g., those 10 or more feet from the tool). This improved sensitivity tends to further improve the reliability of subsequent distance and/or direction to bed calculations. The corrected measurements may also allow for improved accuracy in calculating resistivity anisotropy parameters, particularly when the symmetrization method cannot be applied, e.g., due to the use of a non-symmetric transmitter.

In one aspect the present invention includes a method for correcting downhole resistivity measurements to account for tool bending. The method includes acquiring directional resistivity measurements of a subterranean formation. The directional resistivity measurements include at least one measured coupling component and at least one measured cross-coupling component. The method further includes acquiring a value of a tool bending angle. The method still further includes processing the at least one acquired coupling component and the at least one acquired cross-coupling component in combination with the acquired value of the bending angle to obtain corrected resistivity measurements.

In another aspect, the present invention includes a method for making directional resistivity measurements of a subterranean formation. A directional resistivity tool is deploying in a borehole. The directional resistivity tool includes (i) at least first and second transmitting antennae configured to transmit corresponding substantially pure z-mode and x-mode electromagnetic waves and (ii) at least first and second receiving antennae longitudinally spaced from the transmitting antennae, the first and second receiving antenna are configured to receive corresponding substantially pure z-mode and x-mode components of an electromagnetic wave. The first and second transmitting antennae sequentially transmit corresponding first and second z-mode and x-mode electromagnetic waves into the formation. The first and second receiving antennae receive substantially pure z-mode and x-mode components of each of the transmitted first and second electromagnetic waves. A value of a bending angle between the transmitting antennae and the receiving antennae is acquired and processed in combination with the received z-mode and x-mode components of each of the transmitted electromagnetic waves to obtain corrected directional resistivity measurements.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
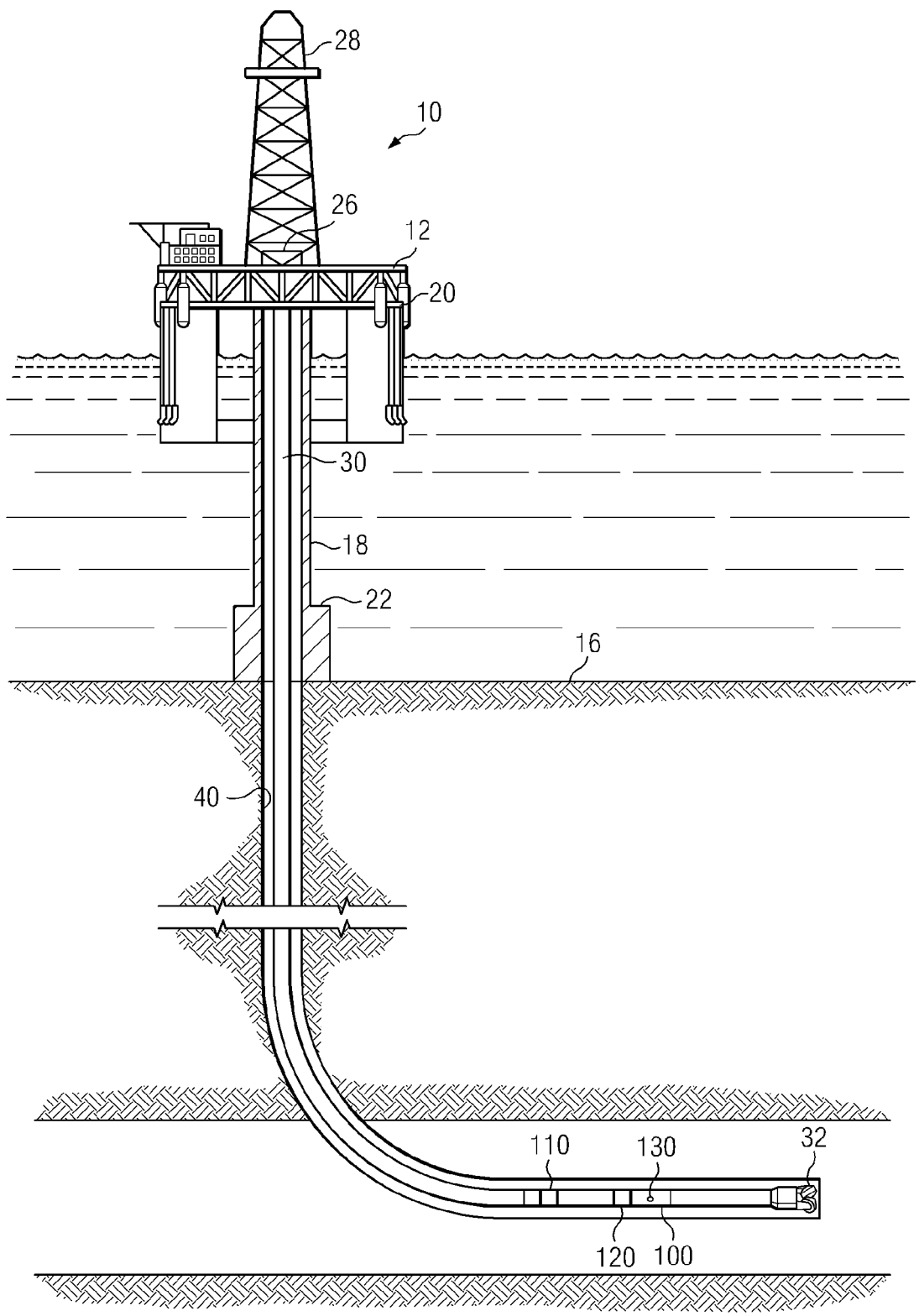
FIG. 1 depicts a drilling rig on which exemplary embodiments of the present invention may be deployed.

FIG. 1 schematically illustrates one exemplary embodiment of a logging while drilling directional resistivity tool 100 suitable for use with the present invention in an offshore oil or gas drilling assembly, generally denoted 10. In FIG. 1, a semisubmersible drilling platform 12 is positioned over an oil or gas formation disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit 32 and LWD directional resistivity tool 100. In the exemplary embodiment depicted, resistivity tool 100 includes a transmitter 110 having first and second collocated transmitting antennae axially spaced apart from a receiver 120 having first and second collocated receiving antenna. It will be understood, however, that the invention is not limited to collocated transmitting and/or receiving antennae. The tool may further optionally include an azimuth sensor 130.

Azimuth sensor 130 (also referred to in the art as a toolface sensor or an orientation sensor) may include substantially any sensor that is sensitive to the rotational orientation of the tool 100 in the borehole, such as one or more accelerometers and/or magnetometers. For example, in one exemplary embodiment, a high frequency magnetic surveying device may be utilized, such as disclosed in commonly assigned U.S. Pat. No. 7,414,405. In the embodiment of FIG. 1, the azimuth sensor 130 is depicted on (or in) the resistivity tool. It will be understood that the invention is not limited to the use of an azimuth sensor or to its placement on resistivity tool 100. An azimuth sensor may also be deployed elsewhere in the BHA.

As is known to those of ordinary skill in the art, a time varying electric current (an alternating current) in the transmitting antenna 110 produces a time varying magnetic field in the formation which in turn induces electrical currents (eddy currents) in the conductive formation. The eddy currents further produce secondary magnetic fields which may produce a voltage response in the receiving antenna 120. The measured voltage in the receiving antenna can be processed, as is know to those of ordinary skill in the art, to obtain a measurement of the secondary magnetic field, which may in turn be further processed to estimate formation resistivity and dielectric constant. These electrical formation properties can be further related to the hydrocarbon bearing potential of the formation.

Directional resistivity tools commonly measure or estimate a cross-coupling component (also referred to herein as a cross-component) of the electromagnetic radiation as the tool rotates in the borehole (e.g., during drilling). As used herein cross-coupling refers to the axial reception of a transverse transmission or the transverse reception of an axial transmission (e.g., measurement of the $H_{zx}$ and/or the $H_{xz}$ components). Those of ordinary skill in the art will readily appreciate that the $H_{zx}$ cross-coupling component is commonly defined as the transverse reception (i.e., the x-mode reception) of an axially transmitted electromagnetic wave (a z-mode transmission). Likewise the $H_{xz}$ cross-coupling component is commonly defined as the axial reception (i.e., the z-mode reception) of a cross-axially transmitted electromagnetic wave (an x-mode transmission).

Directional resistivity tools commonly also measure or estimate one or more coupling components of the electromagnetic radiation. Coupling (or direct coupling) refers to the axial reception of an axial transmission or the transverse reception of a transverse reception (e.g., measurement of the $H_{zz}$ and/or the $H_{xx}$ components). Those of ordinary skill in the art will readily appreciate that the $H_{zz}$ coupling component is commonly defined as the axial reception (i.e., the z-mode reception) of an axially transmitted electromagnetic wave (a z-mode transmission). Likewise the $H_{xx}$ coupling component is commonly defined as the transverse reception (i.e., the x-mode reception) of a cross-axially (transverse) transmitted electromagnetic wave (an x-mode transmission).

Those of ordinary skill in the art will also readily appreciate that the $H_{zz}$ coupling component is commonly measured using non-directional resistivity measurements. It is therefore generally not considered in the art to be a directional component. The $H_{xx}$ coupling component and the $H_{zx}$ and $H_{xz}$ cross-coupling components are commonly considered to be directional components since they require transverse transmission and/or reception. Since the $H_{zz}$ coupling component is also routinely measured when making directional resistivity measurements, it is considered herein to be a directional component when measured in combination with at least one directional component (e.g., $H_{xx}$, $H_{zx}$, and $H_{xz}$). For example, $H_{xx}$, $H_{zx}$, $H_{xz}$, and $H_{zz}$ are considered herein to be a set of directional resistivity measurements.

Figure 2A:
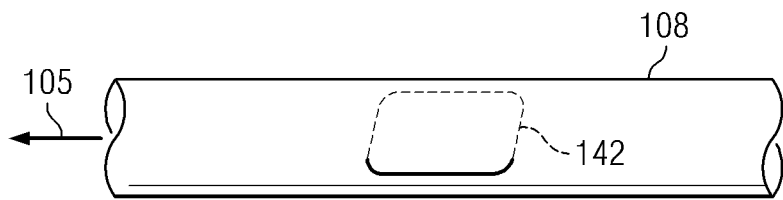
FIGS. 2A-2E (collectively FIG. 2) depict exemplary directional resistivity antennae suitable for use with method embodiments in accordance with the present invention.
Figure 2B:
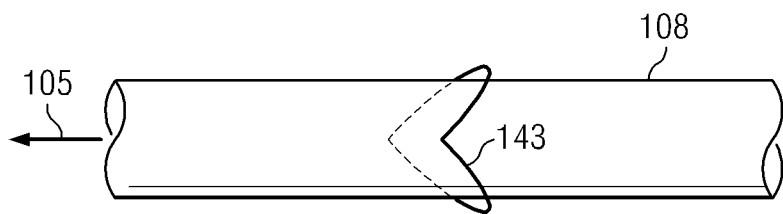
Figure 2C:
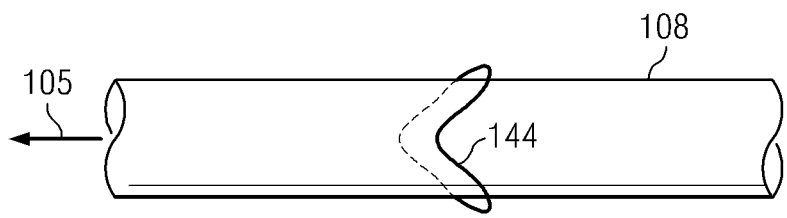
Figure 2D:
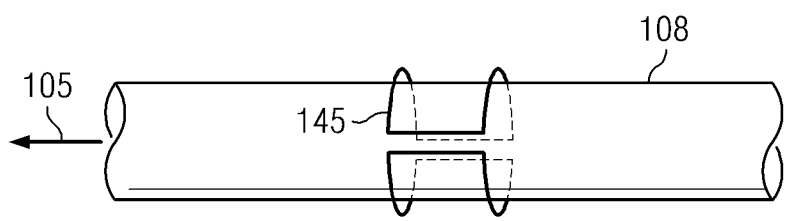
Figure 2E:
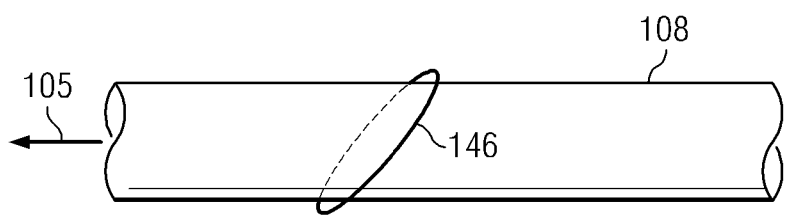

It is well known that the $H_{zx}$ cross-coupling component may be obtained using one or more conventional transverse receiving antennae. Likewise the $H_{xz}$ cross coupling component may be obtained using one or more conventional transverse transmitting antennae. Suitable antenna embodiments for transmitting and/or receiving a transverse component are depicted on FIGS. 2A-2E (collectively FIG. 2). In each configuration, at least a portion of the antenna wire is non-orthogonal (and preferably parallel with) the longitudinal axis 105 of the tool body 108. FIG. 2A depicts a transverse antenna configuration in which a substantially planar loop of antenna wire 142 is deployed parallel with the longitudinal axis 105 (thereby having a dipole moment that is transverse to the axis 105). FIG. 2B depicts a bi-planar antenna configuration in which first and second semi-elliptical (or semi-oval) sections of antenna wire 143 reside on a corresponding distinct first and second geometric planes. FIG. 2C depicts a serpentine configuration in which the antenna wire 144 loops about the tool body such that the axial separation between the non-planar loop of antenna wire 144 and a circular centerline of the antennae varies periodically (e.g., sinusoidally) with respect to the azimuth angle about the circumference of the tool. The antenna embodiments depicted on FIGS. 2B and 2C are disclosed in commonly assigned, co-pending U.S. patent application Ser. No. 12/410,153 (now U.S. Patent Publication 2010/0244841). FIG. 2D depicts a saddle coil 145 configuration including circumferential and axial antenna portions. This saddle coil configuration is described in more detail below with respect to FIG. 3. The configurations depicted on FIGS. 2A through 2D are typically configured for transmitting and/or receiving substantially pure transverse (x-mode) electromagnetic waves. FIG. 2E depicts a conventional tilted antenna 146 configuration suitable for transmitting and/or receiving mixed mode (e.g., mixed x- and z-mode) electromagnetic waves. It will be readily apparent to those of ordinary skill in the art that at least a portion of the antenna wire in the embodiments depicted on FIGS. 2A through 2E is non-orthogonal with the longitudinal axis of the tool body.

Figure 3:
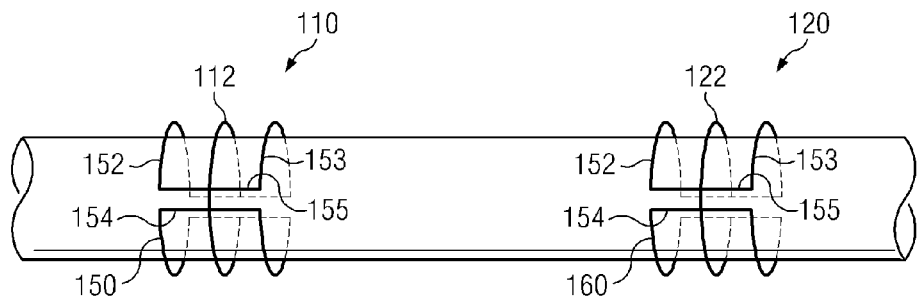
FIG. 3 depicts a portion of a direction resistivity tool suitable for use with method embodiments in accordance with the present invention.

FIG. 3 depicts a portion of directional resistivity tool 100 in further detail. In the exemplary embodiment depicted the transmitter 110 and receiver 120 each include first and second collocated axial (z-mode) and transverse (x-mode) antennae. In the depicted embodiment, saddle coils 150 and 160 are configured as x-mode antennae. Each of the saddle coils 150 and 160 includes first and second circumferential portions 152 and 153 and first and second parallel axial portions 154 and 155. The transmitter 110 and receiver 120 each further include a corresponding conventional z-mode antenna 112 and 122 deployed between the first and second circumferential portions 152 and 153 of the x-mode antenna. It will be understood that the exemplary embodiment depicted on FIG. 3 is purely exemplary. The invention is not limited to the use of collocated antennae or to the use of saddle coil antennae.

Figure 4A:
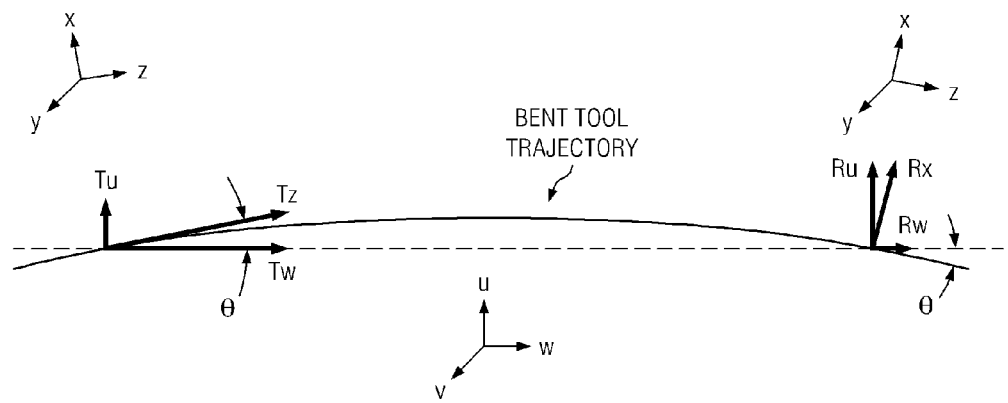
FIGS. 4A and 4B (collectively FIG. 4) depict exemplary bent tool schematics in accordance with the present invention.
Figure 4B:
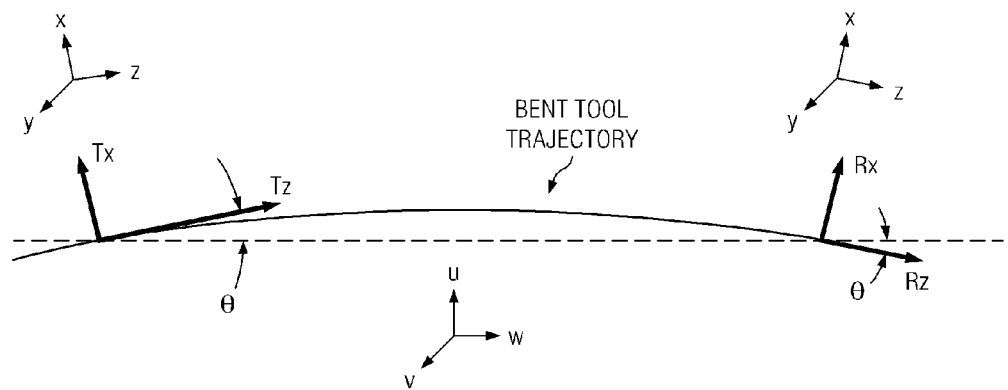

FIGS. 4A and 4B (collectively FIG. 4) depict exemplary configurations in which a directional resistivity tool is bent. In FIG. 4A the tool includes a transmitter having an axial transmitter $T_z$ and a cross axial receiver $R_x$. FIG. 4B is essentially identical to FIG. 4A with the exception that the directional resistivity tool depicted therein includes collocated axial and transverse transmitter antennae $T_z$ and $T_x$ axially spaced apart from collocated axial and transverse receiving antennae $R_z$ and $R_x$. As depicted in FIG. 4 the tool is shown as being bent in the xz plane, although the invention is not limited in this regard. The following analysis may be readily extended to a more general case in which the tool may be bent in the xz and/or yz planes.

FIGS. 4A and 4B define two distinct coordinate systems. The first coordinate system (xyz) is referenced with respect to the tool body with the z-axis pointing in the longitudinal direction (along the length of the tool body in the direction of increasing measured depth). The x-axis and the y-axis are therefore orthogonal to the long axis of the tool. For a bent tool (as depicted), the directions of the x-axis and the z-axis change along the length of the tool body (with the tool trajectory). Those of skill in the art will also realize that the x-axis also rotates as the tool rotates in the borehole. The second coordinate system (uvw) is referenced to a hypothetical straight tool. As such, the direction of the w-axis is unchanged with tool bending. The u-axis also rotates as the tool rotates in the borehole.

With continued reference to FIG. 4A, the exemplary embodiment depicted is configured for measuring the $H_{zx}$ cross-component (the cross-axial reception of an axial transmission). As depicted, the axial transmitter $T_z$ is no longer orthogonal to the cross-axial receiver $R_x$ due to the bending of the tool. In the depicted schematic, the tool bending introduces other couplings into the measured $H_{zx}$ cross-component. In the exemplary embodiment depicted on FIG. 4A, the tool is assumed to be bent such that the transverse receiver $R_x$ points away from the center of the curvature. The invention is not limited in this regard as other bending directions may be treated similarly. In the uvw coordinate system, the axial transmitter $T_z$ may be decomposed into $T_w$ and $T_u$ components, for example, as follows:

$$T_w = T_z \cos \theta$$

$$T_u = T_z \sin \theta \qquad \text{Equation 1}$$

where $T_u$ and $T_w$ represent the u and w components of the moment of the axial transmitter, $T_z$ represents the moment of the axial transmitter, and θ represents the tool bending angle. The cross axial transmitter $R_x$ may also be decomposed into $R_w$ and $R_u$ components as follows:

$$R_w = R_x \sin \theta$$

$$R_u = R_x \cos \theta \qquad \text{Equation 2}$$

where $R_u$ and $R_w$ represent the u and w components of the moment of the transverse receiver, $R_x$ represents the moment of the transverse receiver, and θ is as defined above. Those of ordinary skill in the art will appreciate that the bending angle θ is related to the dogleg severity (DLS). The bending angle θ may computed, for example, as follows:

$$\theta = \frac{L}{200} DLS \qquad \text{Equation 3}$$

where L represents the distance (in feet) between the receiver and the transmitter measured along the tool axis and DLS represents the dogleg severity in units of degrees per 100 ft.

The measured directional magnetic field $H_{zx}$ may be expressed mathematically in terms of the primary and cross (axial and transverse) components in the uvw coordinate system, for example, as follows:

$$H_{zx} = T_u R_u + T_u R_w + T_w R_u + T_w R_w = H_{uu} \sin \theta \cos \theta + H_{uw} \sin^2 \theta + H_{wu} \cos^2 \theta + H_{ww} \sin \theta \cos \theta \qquad \text{Equation 4}$$

where $H_{uu}$, $H_{uw}$, $H_{wu}$, and $H_{ww}$ represent the components of the magnetic field in the uvw coordinate system. For example, $H_{wu}$ represents a magnetic field generated by a hypothetical transmitter oriented in the w-direction and received by a hypothetical receiver oriented in the u-direction. It will be understood that within this system for naming the measured magnetic field responses (or voltage responses), the first index indicates the mode of the transmitter and the second index indicates the mode of the receiver.

With further reference to Equation 4, it will be understood that $H_{zx}=H_{wu}$ when the tool is unbent (i.e., when $\theta=0$). When the tool is bent in the xz plane, however, the $H_{zx}$ measurement is contaminated by $H_{uu}$, $H_{uw}$, and $H_{ww}$ components.

With reference again to FIG. 4B, the tool bending effects on the $H_{zx}$ measurement may be removed by making and taking into account additional measurements. As described above the tool depicted in FIG. 4B includes collocated axial and transverse transmitter antennae $T_z$ and $T_x$ axially spaced apart from collocated axial and transverse receiving antennae $R_z$ and $R_x$. In the uvw coordinate system, the axial and cross-axial transmitters $T_z$ and $T_x$ may be decomposed into $T_w$ and $T_u$ components, for example, as follows:

$$T_w = T_z \cos\theta - T_x \sin\theta$$

$$T_u = T_x \cos\theta + T_z \sin\theta \qquad \text{Equation 5}$$

Where $T_x$ represents the moment of the cross-axial transmitter and $T_u$, $T_w$, $T_z$, and $\theta$ are as defined above. The axial and cross-axial transmitters $R_z$ and $R_x$ may also be decomposed into $R_w$ and $R_u$ components as follows:

$$R_w = R_z \cos\theta + R_x \sin\theta$$

$$R_u = R_x \cos\theta - R_z \sin\theta \qquad \text{Equation 6}$$

where $R_z$ represents the moment of the axial receiver and $R_u$, $R_w$, $R_x$, and $\theta$ are as defined above.

The use of collocated axial and transverse transmitter antennae and collocated axial and transverse receiving antennae advantageously enables the directional resistivity components to be determined in the uvw coordinate system, for example, as follows:

$$H_{uu}=T_u R_u = H_{xx}\cos^2\theta - H_{xz}\cos\theta\sin\theta + H_{zx}\cos\theta\sin\theta - H_{zz}\sin^2\theta$$

$$H_{uw}=T_u R_w = H_{xx}\sin\theta\cos\theta + H_{xz}\cos^2\theta + H_{zx}\sin^2\theta + H_{zz}\sin\theta\cos\theta$$

$$H_{wu}=T_w R_u = -H_{xx}\sin\theta\cos\theta + H_{xz}\sin^2\theta + H_{zx}\cos^2\theta H_{zz}\sin\theta\cos\theta$$

$$H_{ww}=T_w R_w = -H_{xx}\sin^2\theta - H_{xz}\cos\theta\sin\theta + H_{zx}\cos\theta\sin\theta + H_{zz}\cos^2\theta \qquad \text{Equation 7}$$

In Equation 7 the effects of bending are substantially fully removed from the directional resistivity measurements. Each of the coupling components ($H_{uu}$ and $H_{ww}$) and cross-coupling components ($H_{uw}$ and $H_{wu}$) for the unbent tool may be computed from the measured coupling ($H_{xx}$ and $H_{zz}$) and cross-coupling ($H_{xz}$ and $H_{zx}$) components. For example, the aforementioned $H_{wu}$ component (which is equivalent to the $H_{zx}$ component for the unbent tool) may be computed from $H_{xx}$, $H_{xz}$, $H_{zz}$, and $H_{zz}$ as indicated.

It will be understood that the invention is not limited to a full mathematical correction, for example, as given in Equation 7. In certain operations, a partial correction may be suitable (exemplary partial corrections are described with respect to the aforementioned $H_{wu}$ component and may be readily applied to the other components by those of ordinary skill). In a typically downhole operation (e.g., an LWD operation) the bending angle $\theta$ is small (often less than a few degrees between the transmitter and receiver). Moreover, the magnitudes of the cross-coupling components are typically significantly less than those of the coupling components (e.g., an order of magnitude less). Hence the $H_{xz}\sin^2\theta$ term in Equation 7 is commonly insignificant as compared to the other terms. The $H_{wu}$ component, for example, can therefore often be accurately determined as follows:

$$H_{wu}=H_{zx}\cos^2\theta - H_{xx}\sin\theta\cos\theta - H_{zz}\sin\theta\cos\theta \qquad \text{Equation 8}$$

In other partial correction embodiments, only one or the other of the coupling components may be accounted. Such a partial correction may be useful, for example, in the event of a transmitter or receiver failure. For example, in the event of an x-mode transmitter failure, only the and $H_{zx}$ components will be available. Likewise, in the event of a z-mode receiver failure, only the $H_{zx}$ and $H_{xx}$ components will be available. In such examples, the $H_{zx}$ component may be partially corrected by the removal of one of the coupling components as given in Equations 9 and 10.

$$H_{wu}=H_{zx}\cos^2\theta - H_{zz}\sin\theta\cos\theta \qquad \text{Equation 9}$$

$$H_{wu}=H_{zx}\cos^2\theta - H_{xx}\sin\theta\cos\theta \qquad \text{Equation 10}$$

Alternatively, in the event of a z-mode transmitter failure, only the $H_{xz}$ and $H_{xx}$ components will be available and in the event of an x-mode receiver failure only the $H_{xz}$ and $H_{zz}$ components will be available. In such examples, the $H_{xz}$ component may be partially corrected by the removal of one of the coupling components as given in Equations 11 and 12.

$$H_{uw}=H_{xz}\cos^2\theta + H_{xx}\sin\theta\cos\theta \qquad \text{Equation 11}$$

$$H_{uw}=H_{xz}\cos^2\theta + H_{zz}\sin\theta\cos\theta \qquad \text{Equation 12}$$

With reference back to Equation 7, those of ordinary skill will also readily appreciate that for the unbent tool (when $\theta=0$) Equation 7 reduces to the following:

$$H_{uu}=H_{xx}$$

$$H_{uw}=H_{xz}$$

$$H_{wu}=H_{zx}$$

$$H_{ww}=H_{zz} \qquad \text{Equation 13}$$

Figure 5A:
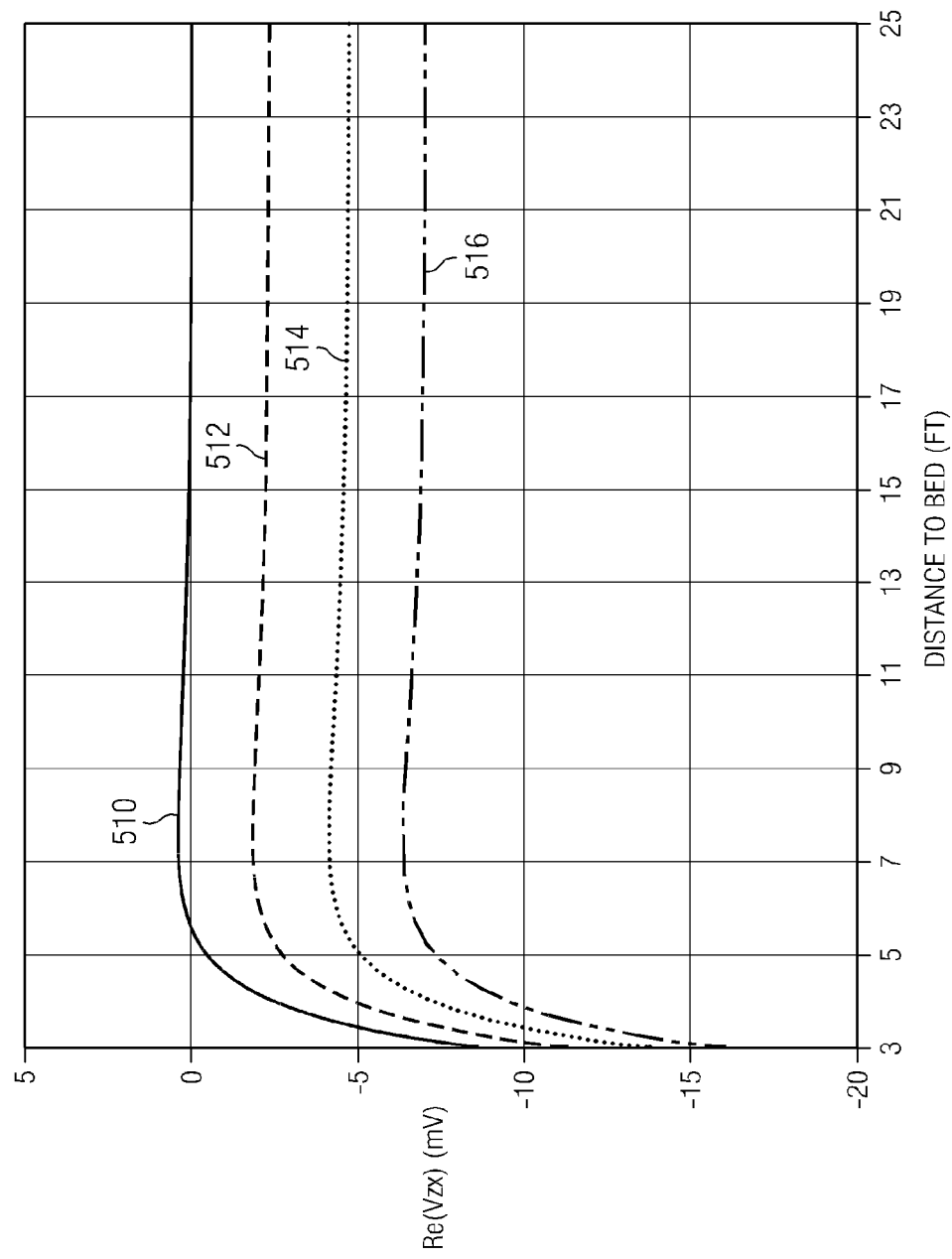
FIGS. 5A, 5B, 6A, and 6B depict examples of the tool bending effect and correction of the tool bending effect using one exemplary embodiment of the present invention.
Figure 5B:
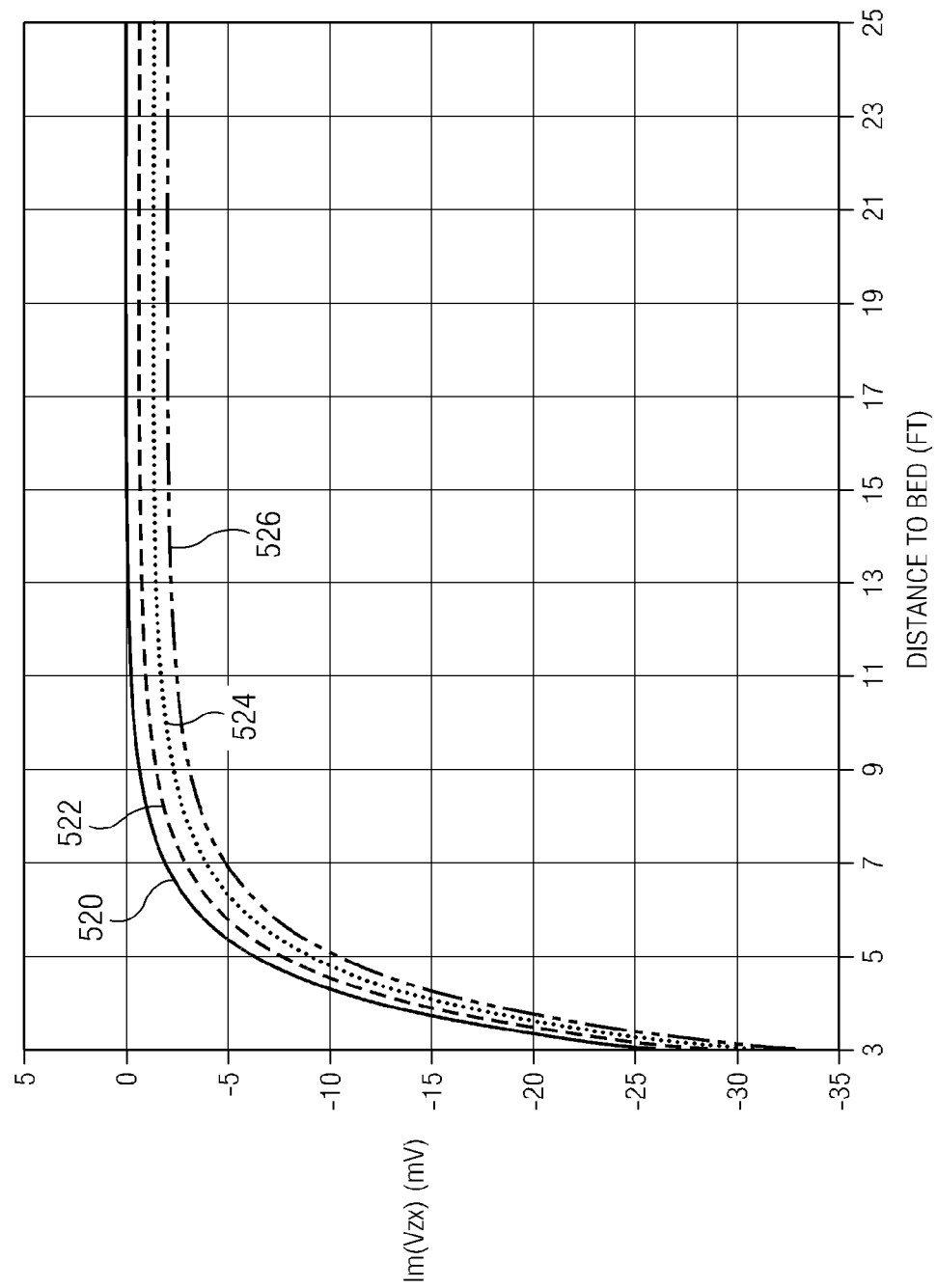
Figure 6A:
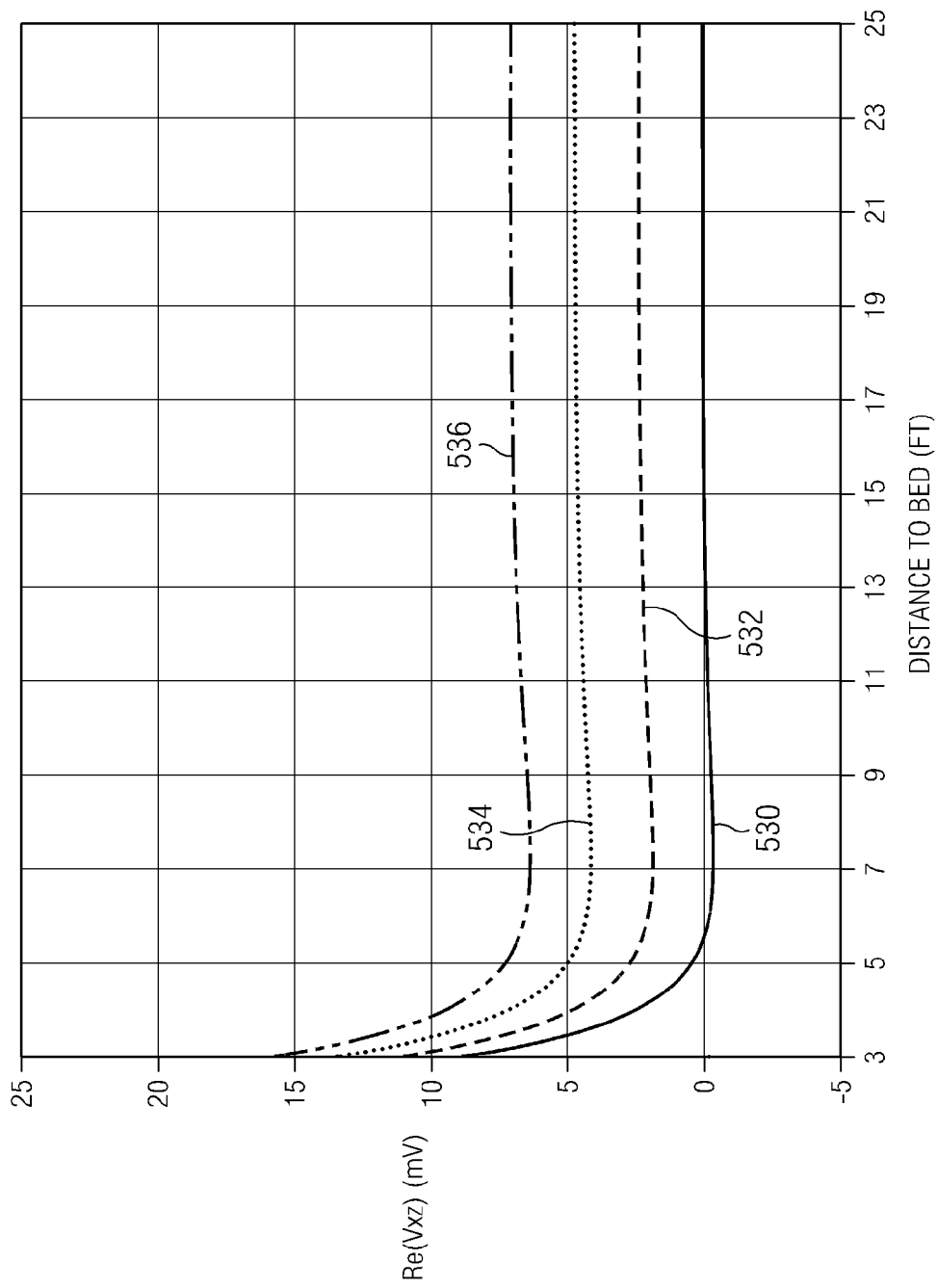
Figure 6B:
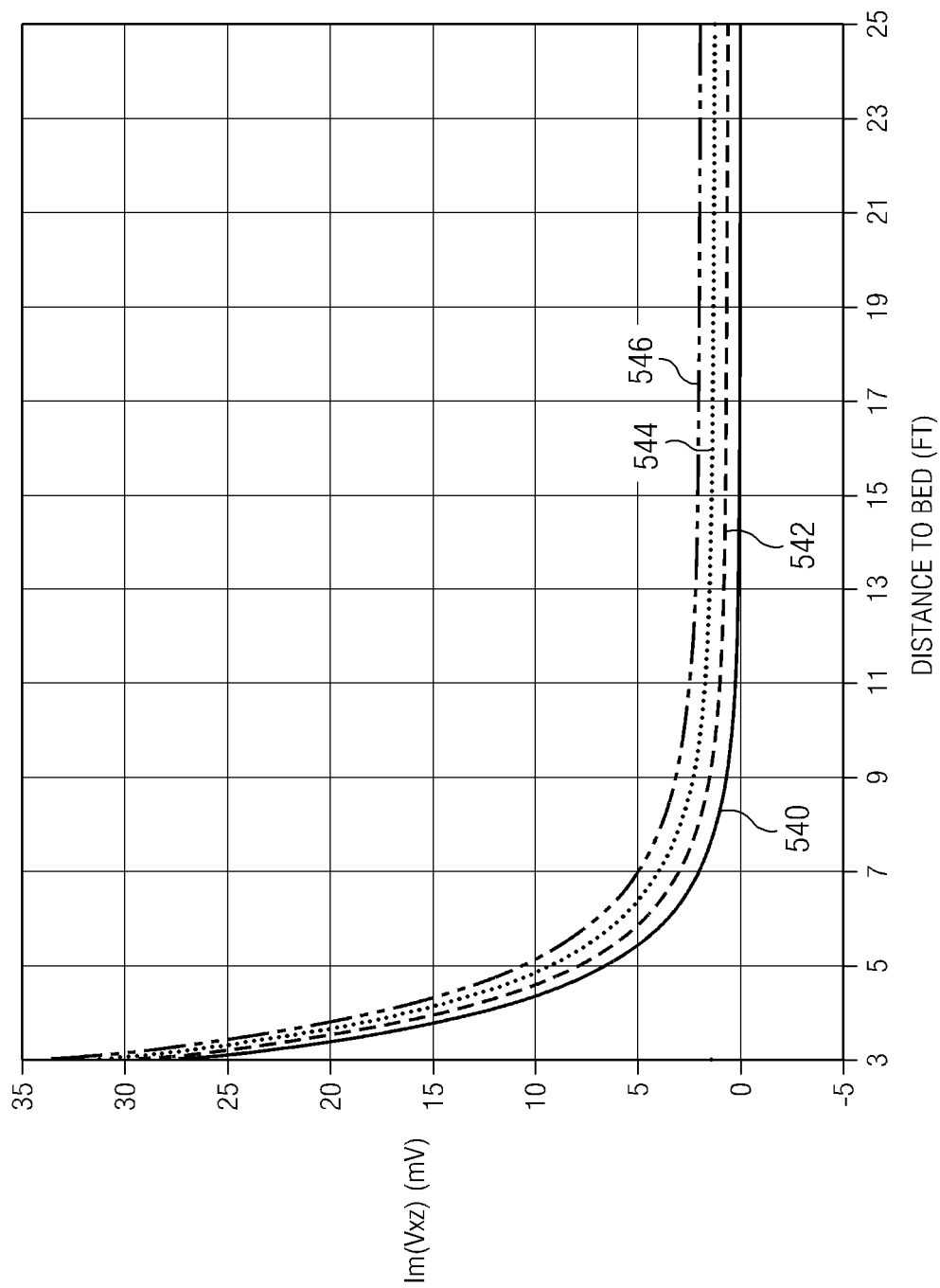

FIGS. 5A and 5B depict examples of the tool bending effect on the directional signal $V_{zx}$ (the voltage measurement $V_{zx}$ being proportional to $H_{zx}$) while FIGS. 6A and 6B depict examples of the tool bending effect on the directional signal $V_{xz}$ (which is proportional to $H_{xz}$). FIGS. 5A and 5B depict plots of the real and imaginary portions (the in-phase and out-of-phase portions) of the voltage measurement $V_{zx}$ versus distance to a remote bed. FIGS. 6A and 6B depict plots of the real and imaginary portions of the voltage measurement $V_{xz}$ versus distance to a remote bed. These plots were obtained using a mathematical model in which the directional resistivity tool is assumed to be parallel (when the tool is unbent) to a bed boundary separating a 100 ohm·m bed from a 1 ohm·m bed. The tool is located in the 100 ohm·m bed. The transmitted electromagnetic wave has a frequency of 2 MHz and the transmitter and receiver are axially separated by 45 inches in this model.

In FIG. 5A, Re($V_{zx}$) is plotted for an unbent tool (i.e., a bending angle of 0 degrees, $\theta=0$) at 510. The effect of the bending angle is depicted at 512, 514, and 516 for bending angles of 5, 10, and 15 degrees per 100 feet. In FIG. 5B Im($V_{zx}$) is plotted for an unbent tool ($\theta=0$) at 520. The effect of the bending angle is depicted at 522, 524, and 526 for bending angles of 5, 10, and 15 degrees per 100 feet. In FIG. 6A, Re($V_{xz}$) is plotted for an unbent tool (θ=0) at 530. The effect of the bending angle is depicted at 532, 534, and 536 for bending angles of 5, 10, and 15 degrees per 100 feet. In FIG. 6B Im($V_{xz}$) is plotted for an unbent tool (θ=0) at 540. The effect of the bending angle is depicted at 542, 544, and 546 for bending angles of 5, 10, and 15 degrees per 100 feet. As clearly depicted, the uncorrected voltage signals (both in-phase and out-of-phase) can be several times larger than the true (corrected) signal, especially when the tool is a far from the bed boundary (e.g., 10 feet or more in the example given). After the application of the bending correction described above with respect to Equation 7, the signals collapse to the true (unbent) signal (overlapping 510, 520, 530, and 540).

As is evident in the forgoing, correction of the tool bending effect requires a measurement or an estimate of the tool bending angle θ. The bending angle may be measured directly, for example, using axially spaced accelerometer or magnetometer sets or with the deployment of one or more strain gauges on the tool body. Commonly assigned U.S. Pat. No. 7,243,719 discloses methods for determining a curvature (essentially a bending angle) of a downhole steering tool using axially spaced accelerometers. Those of ordinary skill in the art will readily be able to utilize similar methodologies to determine a bending angle of a directional resistivity tool. The bending angle may also be estimated from conventional survey data (i.e., from the known curvature of the borehole). The invention is not limited in regards to any particular method for measuring or estimating the bending angle.

It will be understood that the aspects and features of the present invention may be embodied as logic that may be processed by, for example, a computer, a microprocessor, hardware, firmware, programmable circuitry, or any other processing device known in the art. Similarly the logic may be embodied on software suitable to be executed by a processor, as is also well known in the art. The invention is not limited in this regard. The software, firmware, and/or processing device may be included, for example, on a downhole assembly in the form of a circuit board, on board a sensor sub, or MWD/LWD sub. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

We claim:

1. A method for correcting downhole resistivity measurements to account for tool bending, the method comprising:
    (a) acquiring resistivity measurements of a subterranean formation, the resistivity measurements including at least one measured coupling component and at least one measured cross-coupling component;
    (b) acquiring a value of a bending angle;
    (c) processing the at least one coupling component and the at least one cross-coupling component acquired in (a) in combination with the value of the bending angle acquired in (b) to obtain corrected resistivity measurements.

2. The method of claim 1, wherein the corrected resistivity measurements comprise a corrected cross-coupling component.

3. The method of claim 1, wherein the corrected resistivity measurements are obtained in (c) via removing the at least one measured coupling component from the at least one measured cross-coupling component.

4. The method of claim 1, wherein the at least one measured cross-coupling component comprises a z-mode reception of an x-mode transmission and the at least one coupling component comprises a z-mode reception of a z-mode transmission.

5. The method of claim 4, wherein the corrected resistivity measurements obtained in (c) comprise a corrected cross-coupling component obtained according to the following equation:

$$H_{uw}=H_{xz}\cos^2\theta+H_{zz}\sin\theta\cos\theta$$

wherein $H_{uw}$ represents the corrected cross-coupling component, $H_{xz}$ represents the z-mode reception of the x-mode transmission, $H_{zz}$ represents the z-mode reception of the z-mode transmission, and θ represents the value of the bending angle.

6. The method of claim 1, wherein the at least one cross-coupling component comprises a z-mode reception of an x-mode transmission and the at least one coupling component comprises an x-mode reception of an x-mode transmission.

7. The method of claim 6, wherein the corrected resistivity measurements obtained in (c) comprise a corrected cross-coupling component obtained according to the following equation:

$$H_{uw}=H_{xz}\cos^2\theta+H_{xx}\sin\theta\cos\theta$$

wherein $H_{uw}$ represents the corrected cross-coupling component, $H_{xz}$ represents the z-mode reception of the x-mode transmission, $H_{xx}$ represents the x-mode reception of the x-mode transmission, and θ represents the value of the bending angle.

8. The method of claim 1, wherein the at least one cross-coupling component comprises an x-mode reception of a z-mode transmission and the at least one coupling component comprises a z-mode reception of a z-mode transmission.

9. The method of claim 8, wherein the corrected resistivity measurements obtained in (c) comprise a corrected cross-coupling component obtained according to the following equation:

$$H_{wu}=H_{zx}\cos^2\theta-H_{zz}\sin\theta\cos\theta$$

wherein $H_{wu}$ represents the corrected cross-coupling component, $H_{zx}$ the x-mode reception of the z-mode transmission, $H_{zz}$ represents the z-mode reception of the z-mode transmission, and θ represents the value of the bending angle.

10. The method of claim 1, wherein the at least one cross-coupling component comprises an x-mode reception of a z-mode transmission and the at least one coupling component comprises an x-mode reception of an x-mode transmission.

11. The method of claim 10, wherein the corrected resistivity measurements obtained in (c) comprise a corrected cross-coupling component obtained according to the following equation:

$$H_{wu}=H_{zx}\cos^2\theta-H_{xx}\sin\theta\cos\theta$$

wherein $H_{wu}$ represents the corrected cross-coupling component, $H_{zx}$ the x-mode reception of the z-mode transmission, $H_{xx}$ represents the x-mode reception of the x-mode transmission, and θ represents the value of the bending angle.

12. A method for correcting resistivity measurements to account for tool bending, the method comprising:
    (a) acquiring resistivity measurements of a subterranean formation, the resistivity measurements including first and second measured coupling components and first and second measured cross-coupling components;

(b) acquiring a value of a bending angle;

(c) processing the first and second coupling components and the first and second cross-coupling components acquired in (a) in combination with the value of the bending angle acquired in (b) to obtain corrected resistivity measurements.

13. The method of claim 12, wherein the corrected resistivity measurements comprise at least one corrected cross-coupling component.

14. The method of claim 12, wherein the corrected resistivity measurements are obtained in (c) via removing the first and second measured coupling components from at least one of the first and second measured cross-coupling components.

15. The method of claim 12, wherein the first and second measured cross-coupling components comprise an x-mode reception of a z-mode transmission and a z-mode reception of an x-mode transmission and the first and second coupling components comprise a z-mode reception of a z-mode transmission and an x-mode reception of an x-mode transmission.

16. The method of claim 15, wherein the corrected resistivity measurements obtained in (c) comprise at least one corrected cross-coupling component obtained according to at least one of the following equations:

$H_{uw} = H_{xz} \cos^2\theta + H_{xx} \sin\theta \cos\theta + H_{zz} \sin\theta \cos\theta;$ $H_{wu} = H_{zx} \cos^2\theta - H_{xx} \sin\theta \cos\theta - H_{zz} \sin\theta \cos\theta;$ $H_{uw} = H_{xz} \sin\theta \cos\theta + H_{xz} \cos^2\theta H_{zx} \sin^2\theta + H_{zz} \sin\theta \cos\theta;$ and $H_{wu} = -H_{xx} \sin\theta \cos\theta + H_{xz} \sin^2\theta H_{zx} \cos^2\theta - H_{zz} \sin\theta \cos\theta$ wherein $H_{uw}$ and $H_{wu}$ represent the corrected cross-coupling components, $H_{xz}$ represents the z-mode reception of the x-mode transmission, $H_{zx}$ the x-mode reception of the z-mode transmission, $H_{xx}$ represents the x-mode reception of the x-mode transmission, $H_{zz}$ represents the z-mode reception of the z-mode transmission, and $\theta$ represents the value of the bending angle.

17. The method of claim 12, wherein the first and second measured coupling components and the first and second measured cross-coupling components are measured using a directional resistivity tool having (i) first and second transmitting antennae located at a first longitudinal position on the tool and (ii) first and second receiving antennae located at a second longitudinal position on the tool.

* * * * *